United States Patent [19]

Shabrai et al.

[11] 4,216,188
[45] Aug. 5, 1980

[54] CROSS-LINKED MONTMORILLONITE MOLECULAR SIEVES

[75] Inventors: Joseph Shabria, Noam Lahari both of Rehovot, Israel

[73] Assignee: Yeda Research & Development Co. Ltd., Rehovot, Israel

[21] Appl. No.: 836,138

[22] Filed: Sep. 23, 1977

[30] Foreign Application Priority Data

Sep. 23, 1976 [IL] Israel ........................................ 50548

[51] Int. Cl.$^2$ ............................................ C01B 33/26
[52] U.S. Cl. ................................ 423/118; 252/455 R; 423/327; 423/328
[58] Field of Search .................... 423/118, 327, 328; 252/455 R, 455 Z

[56] References Cited

U.S. PATENT DOCUMENTS

| | | | |
|---|---|---|---|
| 3,459,815 | 8/1969 | Noddings et al. | 252/458 X |
| 3,798,177 | 3/1974 | Reed et al. | 423/118 X |

OTHER PUBLICATIONS

Slaughter et al. "Clays and Clay Minerals" 1960, pp. 114-124.
Turner et al., "Soil Science" 1965, vol. 100, No. 3, pp. 176-181.
Carstea et al., "Soil Sci. Soc. Amer. Proc.", vol. 34, 1970, pp. 517-521.
Somasiri et al. "1972 International Clay Conference", vol. II, 1972, pp. 53-63.
Gupta et al., "The American Mineralogist", vol. 54, 1969, pp. 1625-1634.
Brydon et al., "The American Mineralogist", vol. 51, 1966, pp. 875-889.

*Primary Examiner*—Edward J. Meros
*Attorney, Agent, or Firm*—Browdy and Neimark

[57] ABSTRACT

Novel molecular sieves, being montmorillonites cross-linked with aluminum hydroxide or with chromium hydroxide and a process for the production of same comprising interaction between montmorillonite, in the form of a colloidal solution containing fully separated unit layers (reactant A), and a cross-linking agent, consisting of an accurately buffered and aged colloidal solution of a metal hydroxide, dispersed in the form of low molecular weight oligomers (reactant B).

15 Claims, 1 Drawing Figure

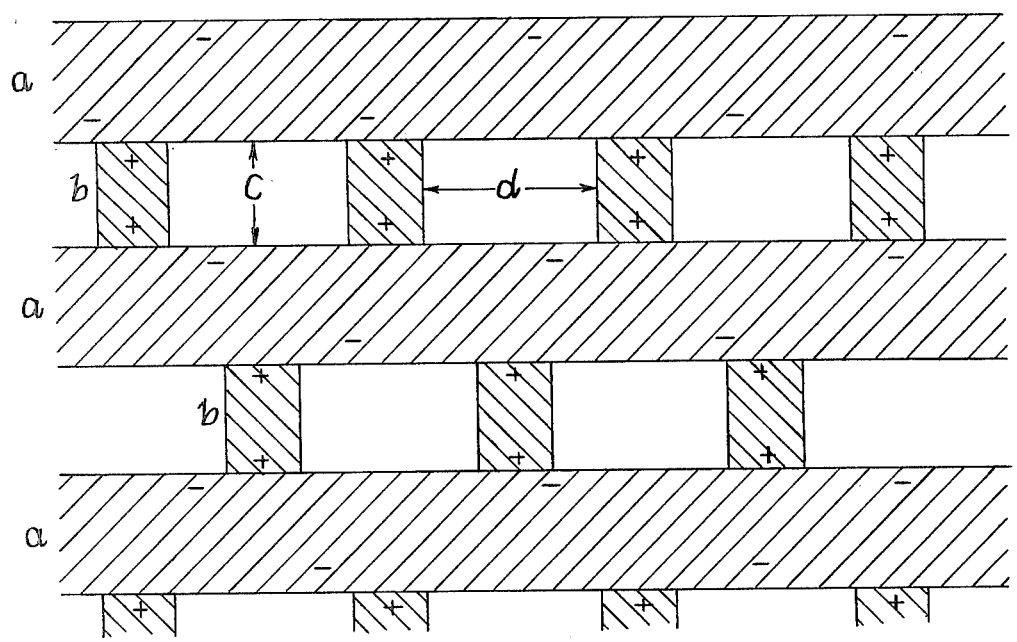

CROSS-LINKED MONTMORILLONITE MOLECULAR SIEVES

Summary of the Invention:

This invention relates to the production of a novel type of molecular sieves, possessing high porosity and adsorptive capacity, and, in most cases, pronounced catalytic activity. The invention provides a convenient process for production of a variety of molecular sieve frameworks by cross-linking of montmorillonite unit layers with oligomeric or polymeric species, derived from metal hydroxides. In the porous cross-linked structures obtained the oligomeric or polymeric species b serve as "pillars", which bridge the unit layers a. The interlayer and lateral distances (c and d, respecitvely) in the porous system, and the degree of uniformity of the latter, depend on the structure and molecular dimensions of the cross-linking component, as well as on the preparative conditions.

Brief Description of the Drawing:

FIG. 1 is a schematic side view, not according to scale, of a cross-linked montmorillonite structure.

FIG. 1 of the drawing, these are shown: a—a montmorillonite unit layer; b—an oligomeric (polymeric) cross-linking species; c—the interlayer distance; d—the lateral (interpillar) distance.

The term "metal hydroxide" (such as "aluminum hydroxide" or "chromium hydroxide"), used herein to define the reactants and products designates a hydroxyl metal compound of a ratio of OH to metal lower than the stoichiometric one.

The smectite used in this invention is usually sodium or lithium montmorillonite possessing a charge density in the range of 0.8–1.1 meq/g smectite. However, other partially swelling montmorillonite forms, e.g. potassium montmorillonite, could also be employed as starting materials. The cross-linking component is usually a metal hydroxide, e.g. aluminum hydroxide or chromium hydroxide, which is easily dispersed to give a stable sol. Water is usually employed as a dispersing liquid medium, but other strongly polar solvents, e.g. alcohols, ketones etc., could be occasionally used for this purpose.

The general method of preparation of cross-linked montmorillonites, consists of the following consecutive steps:

(1) The montmorillonite component is fully dispersed in water, at room temperature, to give a colloidal solution containing separate, negatively charged unit layers (A).

(2) A sol of the metal hydroxide components (B), containing positively charged oligomeric species, is separately prepared either by slow hydrolysis of an appropriately buffered aqueous solution of the corresponding metal salt, or alternatively, by high dispersion of precipitated metal hydroxide in water.

(3) The two reactant colloidal solutions A and B are thoroughly mixed, causing rapid flocculation, which involves adsorption of the positively charged metal hydroxide species on the negatively charged surface of the montmorillonite unit layers.

(4) The cross-linked montmorillonite, precipitated in step 3, is separated from the liquid phase by processes known in the art, such as filtration, centrifugation, freeze-drying (lyophilizing), or simple air-drying.

(5) Finally, the solvent-free cross-linked montmorillonite is stabilized by heat treatment under air or an inert gas, e.g. nitrogen, usually in the temperature range of 150°–450°.

There are several specific features and requirements in the application of the above outlined method of preparation:

(a) The concentration of montmorillonite in the starting colloidal solution (step 1) should be very low, e.g. from ~100 mg/l up to ~800 mg/l.

(b) The pH of the sol containing the cross-linking agent (step 2) should be carefully adjusted below the zero charge point, by titration with dilute (0.1 N) aqueous sodium hydroxide, in order to leave a residual net positive charge on the metal hydroxyde oligomeric species, and thereby prevent excessive growth in the molecular weight of the latter. This adjusted pH is usually in the range of 3.9–4.3 in the case of an aluminum hydroxide sol, and 5.6–6.0 in the case of a chromium hydroxide sol;

(c) The concentration of the metal in the metal hydroxide sol, prepared in step 2 should be preferably in the range of 0.01–0.2 g atom/l for an aluminum hydroxide sol, and in the range of $5 \times 10^{-4}$–$5 \times 10^{-3}$ g atom/l for a chromium hydroxide sol. Maximal porosity and uniformity of the cross-linked structure, as determined by X-ray measurements, is obtained by using a metal hydroxide sol aged for at least 5 days (at 25°) prior to the cross-linking step 3.

(d) The cross-linking process (step 3) should be preferably performed by mixing the montmorillonite suspension (A) and the metal hydroxide sol (B) in a mixing chamber with a highly effective mixing device, i.e. a high-speed stirrer (>2,000 RPM) in this preparative step in order to secure optimal porosity and uniformity in the cross-linked montmorillonite product. Alternatively, the metal hydroxide sol B is slowly added to the montmorillonite solution A while applying a highly efficient mixing device, i.e. an ultrasonic vibrator or a heavy-duty high-speed stirrer (>2,000 RPM).

(e) The weight ratio of metal hydroxide to montmorillonite, applied in the cross-linking step 3, should be such as to secure maximal porosity and uniformity in the final product. In the case of aluminum hydroxide-montmorillonite system this ratio is $1 \times 10^{-3}$ g atom aluminum/g montmorillonite in the final product.

The cross-linked montmorillonites produced in the present invention are characterized by the following physical properties:

A. Uniform basal spacing, indicating a definite thickness of the cross-linking species. For instance, a uniform basal spacing of 18.6 Å, corresponding to an interlayer distance of ~9.0 Å is found in an air-dried sample of montmorillonite cross-linked with aluminum hydroxide (designated as CLM-Al in the following text), while a uniform basal spacing of 18.0 Å, corresponding to an interlayer distance of ~8.5 Å, is found in montmorillonite cross-linked with chromium hydroxide (designated as CLM-Cr). The interlayer spacing of CLM-Al (~9.0 Å) corresponds to a stacked, two-layer arrangement of the cross-linking oligomeric species in the interspace (thickness of the structural unit $Al_6(OH)_{12}^{6+}$ ring ~4.5 Å).

B. Specific surface areas in the range of 160–240 m²/g, as determined by $N_2$ adsorption. From the metal/montmorillonite equivalent ratio in CLM-Al samples with high surface area (~210 m²/g), and on the basis of the diameter of the ring network of the average polymeric species, $Al_{24}(OH)_{60}^{12+}$, it is calculated that in such samples the net interparticle distance is the range of 12–18 Å.

C. Resistance to swelling in water and other polar solvents. For example, a sample of CLM-Al shows only slight change in basal spacing when immersed in water, or in a 3% aqueous solution of polyvinylpyrolidine (PVP). This is in contrast to pure Na-montmorillonite, which swells freely in water, and shows an expanded basal spacing of 22–26 Å in the 3% PVP solution.

D. Good thermal stability. For example, heat treatment of CLM-Al at 250° causes only a minor decrease in basal spacing ($<1$ Å) while at 450° the decrease is $<2$ Å. These small changes are not accompanied by significant loss of specific surface area, and porosity, indicating an important advantage of cross-linked montmorillonites compared to crosslinked organic polymers in regard to thermal stability.

E. Considerable adsorptive capacity. For Example, at 30° and a bromine vapor pressure of 175 mm., a sample of CLM-Al shows a bromine adsorption capacity of 30% by wt., which is considerably higher than that shown by a silica gel adsorbent ($\sim 18\%$ by wt) under the same set of conditions.

The cross-linked montmorillonites produced in this invention possess intrinsic acidity (as shown by benzidine color test) and pronounced catalytic activity, which can be ascribed to (a) the presence of structural hydroxy groups in the cross-linking oligomeric species, and (b) the presence of active sites on the internal montmorillonite surface. Such sites are accessible to organic molecules diffusing through the porous system of the cross-linked montmorillonite, and the catalytic activity of the latter can be demonstrated in typical acid-catalyzed processes, e.g. esterification or ester hydrolysis. For example, $C_2$-$C_5$ normal and branched carboxylic acids can be esterified with $C_2$-$C_6$ normal and branched alcohols in a conventional flow system, at 190°, using CLM-Al as a catalyst in the form of a fixed bed. The converse reaction, viz. hydrolysis of simple esters with steam proceeds readily at 190° in the presence of the same material as catalyst.

The molecular sieve properties of cross-linked montmorillonites produced by the present process are demonstrated by comparison of the esterification rates found for the above mentioned types of reactants in the presence of (a) a conventional acidic catalyst, i.e. H-montmorillonite, and (b) montmorillonite cross-linked with aluminum hydroxide (CLM-Al). It is found that the conventional, non-porous H-montmorillonite catalyst lacks any molecular shape selectivity, i.e. it is essentially insensitive to the extent of branching in the reactant molecules, while the cross-linked (CLM-Al) catalyst shows pronounced molecular sieving and shape-selective effect as expressed in a sharp drop in esterification rate with increase in branching, i.e. in cross-sectional dimensions of the reactants. For example, the relative esterification rates (at 190°) of acetic acid with n-pentanol (cross-sectional diameter=4.4 Å) and neopentyl alcohol (cross-sectional diameter=7.1 Å) in the presence of H-montmorillonite as catalyst are 1.00:0.93, while in the presence of CLM-Al as a catalyst the corresponding ratio is 1.00:0.49. This reflects the sharp decrease in reaction rate due to lower diffusivity of the bulky neopentyl alcohol in the molecular sieve system of the CLM-Al catalyst.

The cross-linking process and the cross-linked montmorillonite products described in this invention differ from procedures and products based on interlayering of montmorillonite with metal hydroxides. The main known interlayering procedures involve: (a) precipitation of hydroxides in the presence of clays, for instance, by treatment of $Al^{3+}$-saturated clays with a base, e.g. sodium or calcium hydroxide, or simply by boiling $Al^{3+}$-saturated clay suspensions to speed up hydrolysis of the intercalated ion; and (b) reacting relatively concentrated clay suspensions with solutions containing partially neutralized $Al^{3+}$ ions. Reported interlayering procedures lead usually to flatwise precipitation of aluminum hydroxide (gibsite or brucite) sheets between the smectite layers. Due to incomplete separation of the smectite unit layers, such processes are usually accompanied by steric blocking near the clay particle edges, leading to markedly uneven distribution of aluminum hydroxide polymers in the produced structures, i.e. high concentration near the edges vs. relatively low concentration in the inner region of the interspace. Such interlayered systems, which are of relatively low porosity or are completely blocked for diffusion or guest molecules, have been studied only in connection with mineralogical and pedological problems. No design of such systems as molecular sieve adsorbents or catalysts has been reported.

The cross-linking process described in this invention is also fundamentally different from processes involving conversion of clay-type materials, in particular kaolin, into zeolites, e.g. A-type, X-type, and Y-type zeolites, and mordenite. X-ray diffraction patterns show basic structural differences between cross-linked montmorillonites, derived by the present process, and zeolites of the above types.

The peculiar properties of cross-linked montmorillonites produced by the present process, i.e. ordered molecular sieve structure, resistance to swelling, high surface area, adsorptive capacity and thermal stability, and, finally, considerable chemical reactivity due to structural hydroxy groups, indicate a variety of potential uses of such materials as molecular sieves, adsorbents, catalysts, and carriers for organic reagents. The presence of reactive structural hydroxy groups on the surface of the cross-linking component (confirmed by infrared adsorption bands near 3,700 cm$^{-1}$) is particularly significant, since it allows use of cross-linked montmorillonites as backbones for preparation of polymeric reagents, or highly specific catalyst systems, by attachment of organic reacting groups or catalytically active organo-metallic functions, respectively.

The cross-linking procedure, and the adsorptive, catalytic and molecular sieve properties of the cross-linked montmorillonite products formed are illustrated in the following Examples.

Description of the Preferred Embodiment

EXAMPLE 1

Powdered montmorillonite (Fisher bentonite B-235) was suspended in water and washed 5 times with aqueous 1N NaCl solution in order to obtain the monionic sodium form. The excess of sodium chloride was removed by centrifugation followed by dialysis. The residual chloride concentration in the equilbrium solution was less than 1 mmol/l. A size fraction of particles smaller than 2 microns was obtained by centrifugation, and then diluted with water to give a starting montmorillonite colloidal solution (A) with a concentration of 285 mg/l. The cross-linking agent used was a sol of aluminum hydroxide (B), which was prepared by titrating 140 ml of aqueous 0.2 M AlCl$_3$ solution with 260 ml of an aqueous 0.2 N NaOH solution at room temperature. The final OH/Al molar ratio in the resulting sol was 1.85, and the corresponding pH was 4.1. This solution was aged for two weeks at room temperature before use.

The cross-linking process was carried out by adding dropwise (10 min) 40 ml of the aluminum hydroxide sol B (containing 70 mg atom Al/l) to 5 l of the montmorillonite suspension A, while applying vigorous (3,000 rpm) mechanical stirring. A strong, instantaneous flocculation was observed and the sediment formed was freeze-dried to give a fluffy white powder. X-ray analysis of the product gave a basal (c) spacing of ~18.3 Å while subsequent heating of the material at 250°, under nitrogen, resulted in a slight decrease of the basal spacing (to 17.3 Å). Specific surface area, measured by N$_2$ adsorption was 160 m$^2$/g after heating at 110° C. and 430° C.

EXAMPLE 2

The starting colloidal solutions A and B and the preparative conditions were the same as in Example 1, except that the relative amounts of A and B were changed in order to give an initial Al/montmorillonite ratio of 1.96 m mole/g. X-ray analysis of (a) a freeze dried sample, and (b) a heat-treated (250°) sample of this product gave a dominant basal spacing of 18.4 Å and 17.5 Å, respectively.

EXAMPLE 3

The starting materials and the cross-linking procedure were the same as described in Example 1, except that a sample of raw, non-treated Umiat bentonite was used in the preparation of the montmorillonite colloidal solution, A. The dry rock sample was fully dispersed in water by immersion for a period of 24 hr, and the size fraction of particles smaller than 2 microns was separated by decantation, and then used in preparing solution A.

X-ray analysis of (1) a freeze-dried sample of the cross-linked product, and (2) a sample of the same product after heat-treatment 250° C. under nitrogen, gave basal spacings of ~18.3 Å and ~17.4 Å, respectively.

EXAMPLE 4

Powdered montmorillonite (Fisher bentonite B-235) was suspended in water and washed 5 times with aqueous 1 N LiCl solution in order to obtain the monoionic lithium form. The excess of lithium chloride was removed by centrifugation followed by dialysis. The residual chloride concentration in the equilibrium solution was less than 1 mmol/l. A size fraction of particles smaller than 2 micron was obtained by sedimentation and freeze dried. The dry powder was suspended in water to give montmorillonite colloidal suspension (A) with a concentration of 102 mg/l. The cross-linking agent was the same as in Example 1, except that it was aged at 25° C. and was diluted by water 2.5 times before use. The pH was 4.08.

The mixing apparatus was a hydraulic setup of three pistons operated by air pressure and moving simultaneously back and forth. Two cylinders were connected to the same montmorillonite suspension and one piston was connected to the aluminum hydroxide sol. By means of unidirectional valve systems the cylinders were filled by their respective reservoirs every time that the pistons moved to one direction, and were emptied from their liquid every time that the pistons moved to the other direction. The two solutions (montmorillonite suspension supplied by two pistons, and aluminum hydroxide sol supplied by the third piston) entered a mixing chamber with a magnetic stirrer, and the combined liquid, including the flocculated CLM-Al, was collected. The pH was 4.77. Part of the CLM-Al thus synthesized was freeze dried and used for suface area measurements, and the other part was dried on a microscope slide and used for x-ray measurements. At the air-dry state the basal spacing was 19.2 Å, as measured by x-ray apparatus. Heating to 110° C. gave basal spacing of 18.4 Å, which was rather constant for temperatures up to 430° C. The specific surface area after heating to 110° C., as measured by N$_2$ adsorption, was 211 m$^2$/g.

EXAMPLE 5

The starting colloidal solution A contained homoinic sodium montmorillonite in a concentration of 59 mg/l, while the cross-linking agent used was a colloidal solution of chromium hydroxide (B), prepared by titrating 500 ml of a $0.5 \times 10^{-3}$ M aqueous solution of CrK(SO$_4$)$_2$ with 4.5 ml of a 0.1 N aqueous NaOH solution. The initial OH/Cr molar ratio in the resulting sol B was 1.80, and the pH was 5.8. This solution was aged for two weeks at room temperature before use.

The cross-linking step was carried out by adding dropwise (10 min) 71 ml of the sol B to 200 ml of the montmorillonite suspension A. The reaction mixture was left for 1.5 hr and the sediment formed was separated and freeze-dried. The final Cr/montmorillonite ratio in the cross-linked product obtained in this preparation was 3.0 (mmol/g). X-ray analysis of a freeze-dried sample of this product gave a basal specing of 18.0 Å.

EXAMPLE 6

A 200 mg sample of CLM-Al (montmorillonite cross-linked with aluminum hydroxide; initial Al/montmorillonite ratio 1.94 mmol/g) was mixed with 1 g of inert catalyst carrier (Carborundum Co. silicon carbide, type CMM) and placed as a fixed bed inside a conventional flow reactor. The catalyst was activated at 250° under dry nitrogen for 2 hr, and subsequently the temperature was set at 190°. A liquid feed, consisting of 0.74 g of propionic acid and 1.48 g of n-butanol (molar ratio 1:2) was introduced in the reactor at a constant hourly space velocity (LHSV) of 2.0 hr$^{-1}$ (liters of liquid feed per liter of catalyst volume per hour). A slow stream of nitrogen was maintained throughout the operation. The conversion of propionic acid, as determined by gas chromatography, was 91.0%, and the yield of n-butyl propionate, calculated on converted acid, was >99%.

EXAMPLE 7

The experimental procedure was identical with that given in Example 6. The catalyst bed consisted of a 200 mg sample of CLM-Al (Al/montmorillonite ratio=1.92 mmol/g) in admixture with 1 g of inert silicon carbide carrier, while the liquid feed was a mixture containing 1.2 g (0.02 mol) of acetic acid and 3.6 g (0.04 mol) of n-amyl alcohol (1-pentanol). The esterification was performed by passing the feed over the catalyst at a temperature of 190°, using an LHSV of 2.5 hr$^{-1}$. The conversion of acetic acid into n-amyl acetate was 64.6%, and the process was free of any side reactions, as determined by gas chromatography.

EXAMPLE 8

The catalyst bed, the acetic acid/alcohol molar ratio, the experimental conditions, and the esterification procedure were exactly the same as in Example 7, except that neopentyl alcohol (2,2-dimethyl-1-propanol) was used as alcoholic reactant, instead of n-amyl alcohol. The conversion of acetic acid into neopentyl acetate was 32.0%, and the process was free of any side reactions, as determined by gas chromatography.

EXAMPLE 9

A sample (22.3 mg) of CLM-Al (montmorillonite cross-linked with aluminum-hydroxide), prepared according to the procedure described in Example 1, was introduced in an adsorption apparatus equipped with a quartz spring balance, and exposed to a bromine pressure of 175 mm at 30°. The amount of bromine adsorbed by the CLM-Al sample at equilibrium under these conditions was 6.7 mg, which corresponds to a bromine adsorption capacity of 30% by weight.

We claim:

1. A process for the production of molecular sieves with comprises reacting a colloidal solution of a monoionic montmorillonite having a concentration of 100 mg to 800 mg montmorillonite per liter, in the form of fully dispersed negatively charged unit layers at room temperature, with an aged sol of a metal hydroxide aged for at least 5 days at ambient temperature, said metal hydroxide being selected from the group consisting of aluminum hydroxide and chromium hydroxide, at a pH adjusted below the zero charge point having a residual net positive charge on the said metal hydroxide, under vigorous agitation, resulting in a rapid flocculation of the montmorillonite cross-linked with said metal hydroxide, separating the product from the liquid phase, and stabilizing the product by heat treatment.

2. A process according to claim 1, wherein the metal hydroxide is aluminum hydroxide, the sol of the said aluminum hydroxide is at a pH of 3.9 to 4.3 and the metal concentration in the aluminum hydroxide sol is in the range from 0.01 to 0.2 g-atom/liter.

3. A process according to claim 1, wherein the ratio of aluminum to montmorillonite is between 1.4 to 3.5 millimole/gram.

4. A process according to claim 1, wherein the metal hydroxide sol is a sol of chromium hydroxide, buffered to a pH in the range between pH 5.6 and pH 6.0 and the metal concentration in the said sol is form $5 \times 10^{-4}$ to $5 \times 10^{-3}$ g-atom/liter.

5. A process according to claim 1, wherein the weight ratio of metal hydroxide to montmorillonite is such that the final product contains from $10^{-3}$ to $10^{-2}$ g-atom metal per gram of montmorillonite.

6. A process according to claim 1, wherein the heat treatment is effected in air or in an inert atmosphere at a temperature from 150° C. to 450° C.

7. A process according to claim 1, wherein the flocculated product is subjected to air-drying or freeze-drying in order to remove the liquid.

8. A molecular highly porous sieve made in accordance with the process of claim 1 and having a basal spacing in the range of between 17.3 Å and 19.2 Å, a surface area of 160 to 240 m²/g determined by nitrogen adsorption, being a montmorillonite cross-linked by hydroxy-metal moieties selected from hydroxy aluminum oligomers and chromium hydroxide oligomers, the ratio of said metals to montmorillonite being from $10^{-3}$ to $10^{-2}$ g atom metal per gram montmorillonite.

9. A molecular sieve according to claim 8, wherein the product contains from $10^{-3}$ to $3 \times 10^{-3}$ atom aluminum per gram montmorillonite.

10. A highly porous molecular sieve according to claim 8, wherein the ratio of chromium to montmorillonite is from 1 to 6 millimoles per gram.

11. A heat-treated porous molecular sieve according to claim 9, having a uniform basal spacing of from 17.3 Å to 18.4 Å.

12. A process according to claim 1, wherein said colloidal solution of monoionic montmorillonite is obtained by dispersing montmorillonite in water at room temperature, to give said colloidal solution containing separate, negatively charged unit layers; said aged sol of a metal hydroxide having a residual net positive charge is prepared by titration with dilute aqueous sodium hydroxide; and said reaction under vigorous agitation is carried out in an ultrasonic vibrator or a high-speed stirring device operating at at least 2,000 rpm.

13. A molecular sieve according to claim 8 which does not show any substantial change in basal spacing when treated with water or other polar solvents.

14. A heat-treated porous molecular sieve according to claim 11 which has been heated in the range of 150°–450° C.

15. A molecular sieve according to claim 8 of homogeneous structure and constituting a plurality of layers of said montmorillonite joined together by pillars of said hydroxymetal moieties which bridge the layers of montmorillonite, the distance between layers of montmorillonite being about 8.5–9 Å.

* * * * *

UNITED STATES PATENT AND TRADEMARK OFFICE
CERTIFICATE OF CORRECTION

PATENT NO. : 4,216,188
DATED : August 5, 1980
INVENTOR(S) : SHABTAI et al

It is certified that error appears in the above-identified patent and that said Letters Patent are hereby corrected as shown below:

[75] "Lahari" should read --Lahav--

Signed and Sealed this

Thirtieth Day of December 1980

[SEAL]

Attest:

SIDNEY A. DIAMOND

Attesting Officer

Commissioner of Patents and Trademarks